(No Model.)
J. W. DAVIS.
DUMPING CAR.
No. 374,588. Patented Dec. 13, 1887.
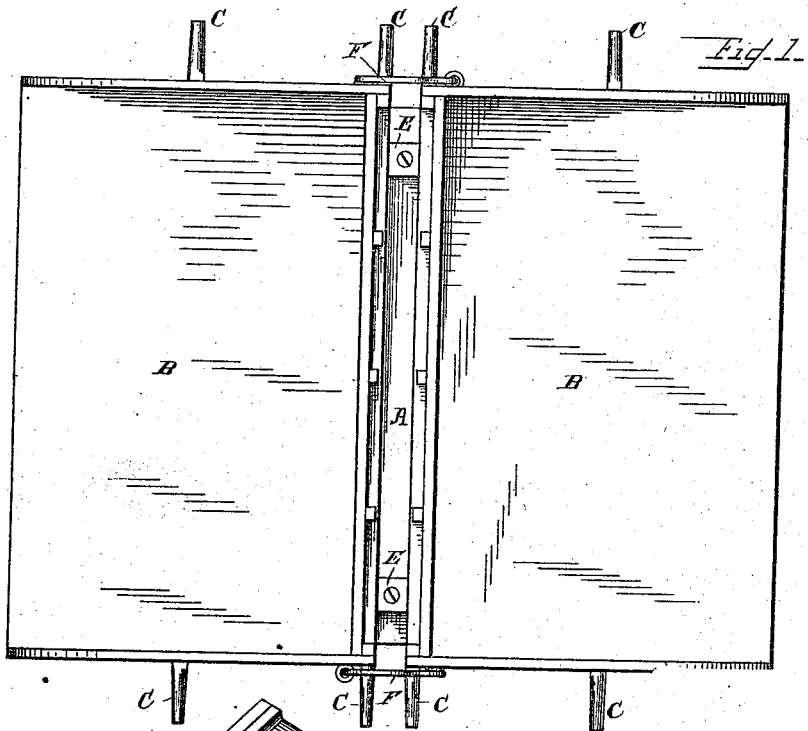
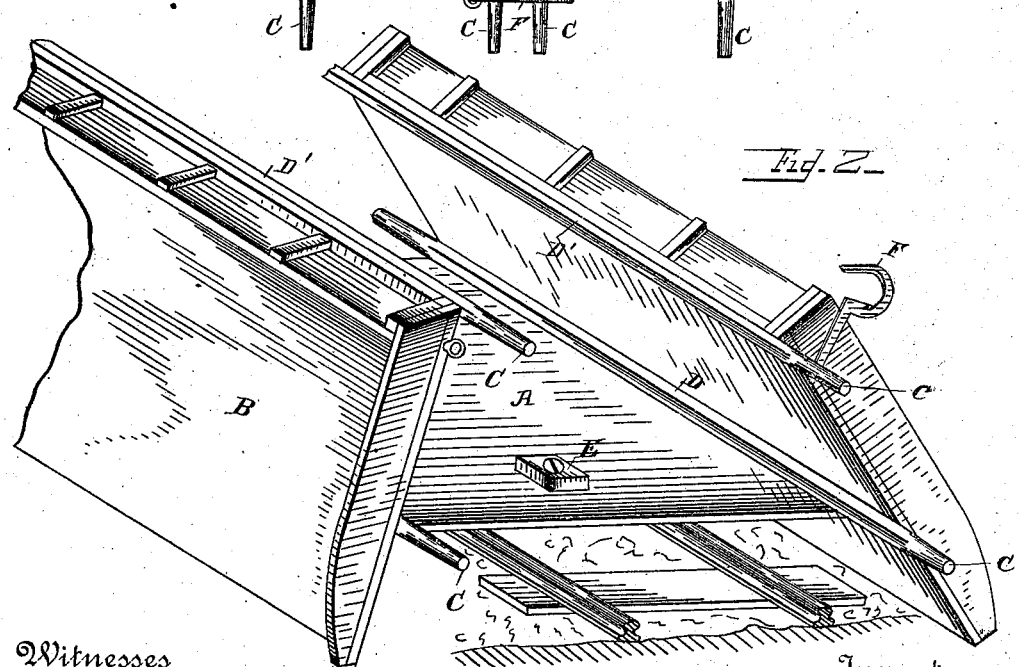
Witnesses
G. A Tauberschmidt,
Wm M Stockbridge.
Inventor
James W. Davis.
By his Attorney
O. D. Stockbridge

UNITED STATES PATENT OFFICE.

JAMES W. DAVIS, OF STAUNTON, VIRGINIA.

DUMPING-CAR.

SPECIFICATION forming part of Letters Patent No. 374,588, dated December 13, 1887.

Application filed July 5, 1887. Serial No. 243,417. (No model.)

*To all whom it may concern:*

Be it known that I, JAMES W. DAVIS, a citizen of the United States, residing at Staunton, in the county of Augusta and State of Virginia, have invented certain new and useful Improvements in Dumping-Cars; and I do hereby declare the following to be a full, clear, and exact description of the invention, such as will enable others skilled in the art to which it appertains to make and use the same.

This invention has reference to means for converting an ordinary hand car or truck into an efficient dumping-car, so that it may be used to carry dirt or gravel from one point and dump it at another point on the road.

Heretofore, when light repairs were required and gravel and the like was moved by hand-cars, the material was placed on the platform of the car and discharged therefrom by shoveling. This practice is both laborious and expensive; and the object of my invention is to avoid these objections and provide means for easily and economically discharging loads of material from cars or trucks of this character.

To these ends my invention consists, essentially, in a tray provided with handles and with a pivot-bar arranged near the middle of its width, so that it will be nearly balanced thereon, whereby it may be readily handled and tilted over the edge of a platform or car.

The invention also consists in the combination, with the platform car or truck, of a dumping-tray or pair of dumping-trays provided with handles and pivot-bar, as hereinafter described and claimed.

In the drawings forming a part of this specification, Figure 1 is a plan showing a pair of dumping-trays supported on an ordinary hand-car and locked together to keep them in place. Fig. 2 is a perspective showing the platform of the car and the trays tilted on their pivot-bars to dump their load.

A is the floor of a hand or other platform car or truck.

B B are loose or movable trays. (Shown in Fig. 1 as resting on the floor of a platform-car.) Each tray is provided with handles C C and with pivot-bar D, the latter being arranged near the middle of the width, so that the tray will be nearly balanced. A second bar, D', is attached to the inner edge of each of the trays, as shown. The bars D and D', by preference, extend beyond the ends of the tray and form the handles C C, and constitute a stretcher to which the tray is secured and by which it is handled.

E E are blocks fastened to the floor of the car, and operate as stops or abutments to keep the trays from sliding laterally when in use. Obviously a bar extending along the floor of the car will serve the same purpose as the blocks.

F F are hasps to hook in eyes or staples, and serve as suitable fastenings for holding the trays together when they are adjusted on the car for use.

To convert an ordinary hand-car into an efficient dumping-car, trays, such as herein described, are lifted by their handles and placed on the floor of the car with their bars D' bearing against the blocks E E. Then the trays are secured together by suitable fastening devices, as described. The trays are then loaded with dirt, gravel, or other material, the car moved to the desired location, the fastenings released, and the trays tilted on their pivot-bars at the edge of the platform to dump their contents. This last operation is readily accomplished by lifting the slightly superior weight of load inside the pivot-bar.

Instead of the fastening devices described, or in addition thereto, yokes or bars to connect the handles may be used.

Obviously a single tray constructed to operate as hereinbefore described may be used with advantage with a hand-car; but the greatest benefit is derived from the use of a pair of trays.

Having thus described my invention, what I claim as new, and desire to secure by Letters Patent, is—

1. A dumping-tray provided with handles and with a pivot-bar arranged near the middle of its width, so that the tray is nearly balanced thereon and adapted for tilting over a rest, substantially as described.

2. The combination, with a platform-car, of a pair of removable trays provided with handles and pivot-bars, as described, and means for fastening the trays together and for preventing lateral movement thereof when in use, substantially as described.

In testimony whereof I affix my signature in presence of two witnesses.

JAS. W. DAVIS.

Witnesses:
F. FOWLER,
C. T. HAMMOND.